(No Model.)
J. K. KESSLER.
PROCESS OF MAKING COPPER SALTS BY THE AID OF ELECTRICITY.
No. 294,051. Patented Feb. 26, 1884.
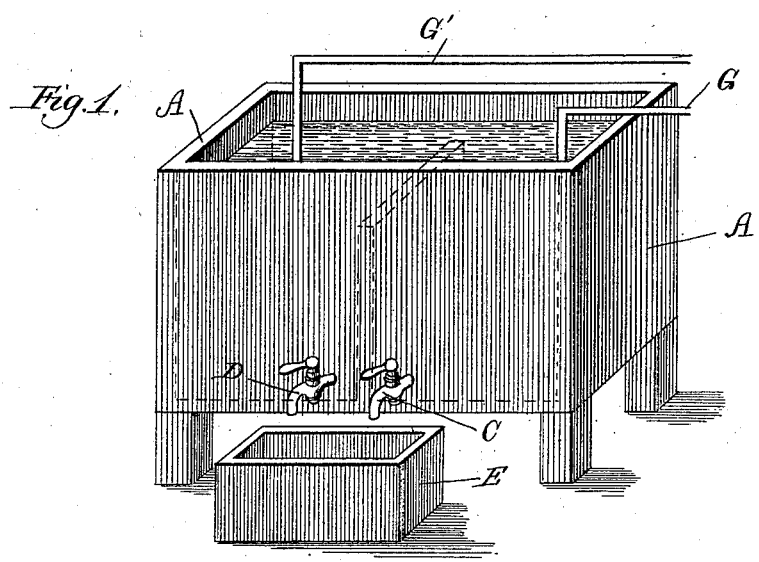
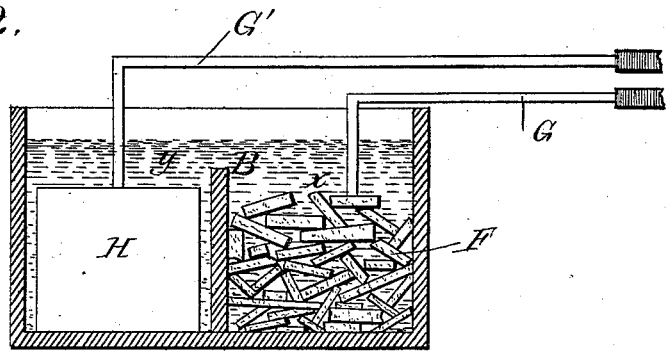
Witnesses:
Chas. E. Gaylord.
W. Limbach.
Inventor:
Johann Karl Kessler,
by P. C. Dyrenforth
Attorney.

UNITED STATES PATENT OFFICE.

JOHANN KARL KESSLER, OF MILWAUKEE, WISCONSIN, ASSIGNOR TO THE WISCONSIN CHEMICAL COMPANY, OF WISCONSIN, AND GEORGE SYLVESTER, OF MILWAUKEE, WISCONSIN.

PROCESS OF MAKING COPPER SALTS BY THE AID OF ELECTRICITY.

SPECIFICATION forming part of Letters Patent No. 294,051, dated February 26, 1884.

Application filed August 3, 1882. (No model.)

*To all whom it may concern:*

Be it known that I, JOHANN KARL KESSLER, a subject of the Emperor of Germany, residing at Milwaukee, in the county of Milwaukee and State of Wisconsin, have invented certain new and useful Improvements in Processes of Making Suboxide and the Acetates of Copper; and I hereby declare the following to be a full, clear, and exact description of the same.

My invention relates to processes of preparing the above compounds by chemical reactions, with the aid of electrolysis.

In the manufacture of verdigris (acetate of copper) as commonly practiced, and other copper compounds, sheets or plates of copper are brought into close contact with grape-skins in full acetic fermentation, and are allowed to remain in such contact until a crust of verdigris of sufficient thickness has formed, which is then scraped off. This process requires, in the first place, a great deal of time—commonly from six to eight weeks—and even then only a proportionately small part of the copper operated upon is transformed into verdigris. The remaining non-oxidized copper has repeatedly to be exposed to the influence of the fermenting grape-skins, and properly to conduct this manipulation requires great care and much labor, as the copper plates must frequently be taken out of the fermenting mass, and the grape-skins have often to be changed.

Another material disadvantage of the old method is that it can be carried on profitably only at places where grapes are largely grown, and, as grape-skins have to be used while fresh, the manufacture is also confined to certain seasons of the year. By the fermentation of the skins, alcohol is produced at first, which is converted into acetic acid. This process of conversion is, however, attended with considerable increase of temperature, and consequently a loss of alcohol and acetic acid by evaporation cannot be avoided, and not unfrequently the grape-skins rot, to the material injury of the results sought to be accomplished. All these disadvantages are entirely done away with by the new process herein described.

By my process, copper in a very short time is oxidized, not in part, but wholly and entirely. The manufacture can be carried on in all seasons and at any place. It is not subject to any accidents, and a loss of acetic acid is impossible, so that in the production of a given quantity of verdigris no more acetic acid is needed than the quantity theoretically calculated. Besides, the product is superior to that made by means of grape-skins, on account of its purity and of its perfectly even composition. It is always pure basic acetate of copper. From the basic acetate of copper so produced every kind of verdigris can easily be obtained.

Before proceeding to describe the *modus operandi* of my new process, I consider it advantageous to a better comprehension by others to outline the science and theory of the same in a few words; but, as a matter of course, in doing so I take it for granted that common principles of science and simple chemical propositions need not be defined at length.

It is well known that an electric current possesses the remarkable characteristic of separating into its single components every chemical compound through which, in a fluid dissolved state, it is made to pass. Common salt is such a chemical compound. It consists of the elementary substances sodium and chlorine, and is therefore called "chloride of sodium." Chloride of potassium is another such compound. Now, if chloride of sodium (common salt) is dissolved in water, and an electric current is made to pass through the solution, the sodium and the chlorine—which until then are united together—become not only separated from each other, but they assume places in the solution at entirely different points. Chlorine always passes to the pole where the electric current enters, while the sodium accumulates where the current leaves the saline solution. Upon the latter characteristic mainly rests my new process. If we place a plate or piece of copper where the electric current enters the solution, the chlorine which gathers at that point will violently seize upon the copper, and, while it dissolves the same, it forms therewith a new chemical compound—namely, chloride of copper. The process of dissolving does not, however, end here. The latter substance has the same affinity for copper as chlorine, and dissolves the copper still more, and forms with it subchloride of copper—a compound which readily dissolves in the surrounding salt solution—so that as a result of my process, at the positive pole, we obtain a solution of subchloride of copper in chloride of sodium. Let us now turn our attention to what goes on at the negative pole. The salt solution in immediate contact with this pole, throughout the whole process, will be found in lively motion, with numerous gas-bubbles rising to the surface. If we inquire into the cause, the same is easily ascertainable. As explained before, the sodium collects toward the negative pole. It is a metal which oxidizes very readily. When it comes into contact with water, it forms oxide of sodium. Hydrogen consequently becomes free, and escapes in the form of gas. This is the process at the negative pole. The electric current has drifted the sodium toward that side, and as rapidly as formed it oxidizes, absorbing the oxygen from the water of the salt solution; and while the hydrogen thereby freed escapes, and causes the ebullition above alluded to, we obtain, as the product of the process on the negative side, oxide of sodium, which also freely dissolves in the surrounding solution. Both of these new products or solutions—namely, the subchloride of copper dissolved in chloride of sodium, and the oxide of sodium, also dissolved as aforesaid—on account of their greater specific gravity, have a tendency to sink; and if the manipulation is so conducted that the formation of these different bodies takes place separately in different compartments, as hereinafter particularly described, both of these new solutions will be found at the bottom of the dissolving cells or tanks. They present themselves in the form of liquids almost as clear as water, having a strong affinity for each other, and, when intermixed, afford a striking spectacle. At first clear and colorless, the liquid becomes on intermixture opaque and intensely orange yellow, and after a short while a heavy deposit or sediment of the same color is precipitated. The liquid part above the sediment, when fully settled, resumes its transparency and lack of color, and will be found on examination to be merely the solution of common salt, which can be returned to the dissolving-tanks and used over and over again in transforming new masses of copper. The yellow sediment is a compound of copper, oxygen, and water, chemically known as "hydrated suboxide of copper." The formation of this new product and the salt solution above is also easily explained, for the two bodies out of which the same originated decompose each other on being mixed together, forming hydrated suboxide of copper and chloride of sodium. The chlorine of the subchloride of copper enters into combination with the sodium, and the oxygen of the oxide of sodium is taken up by the copper of the subchloride of copper. As the hydrated suboxide of copper is insoluble in a salt solution, it is precipitated in the form of a sediment, as above stated, while the salt solution gathers above.

The above processes can be made to work continuously and uninterruptedly, since the salt solution will regenerate itself, as before explained. Nothing but copper, electricity, and water are consumed in the operation, and the successful manipulation requires but little skill and education in the art. The sediment obtained as above, after being washed and freed from its still adhering salt solution, ought to be dried by a very low heat. When dry, the sediment is still of an orange-yellow color. It forms a most excellent material for the manufacture of basic acetate of copper, as will be described hereinafter.

If it is intended to bring the product into market as suboxide of copper, it is only necessary to wash it out upon the filter with boiling instead of cold water, and then to dry it. It thereby becomes of a beautiful red color, and is pure suboxide of copper. Where suboxide of copper is the ultimate product sought, however, I prefer to produce it direct by allowing the products forming at the opposite poles to commingle as fast as they form, as hereinafter described.

I now proceed to a particular description of the process, and of the mechanical means which I have found best adapted to accomplish the aforementioned objects and results. As to the apparatus, I use a steam-engine in connection with a suitable magneto-electric machine, of which, however, nothing especial need be said, as they ought to be sufficiently known; also, one or more dissolving cells, tanks, or vessels, of wood or other non-conducting material. These dissolving-cells are divided by a partition somewhat lower than the outside walls into separate compartments, as shown in the accompanying drawings, of which Figure 1 represents a perspective view of an apparatus suitable for carrying my process into effect, and Fig. 2 a central vertical section of the same.

A is the tank, B the partition-wall, and C and D faucets to draw off the solution into a second vessel, E. The vessel A is filled with a solution of common salt, so that the partition is fully covered, and by means thereof the electric current can pass from one compartment to the other. Now, I place the copper, F, which is intended to be oxidized into the compartment $x$, and connect the same by a copper bar, G, with the positive pole of the magneto-electric machine. In the other compartment, $y$, I place a piece of copper or other good conductor, H, the surface whereof is proportionate to the copper in $x$, and connect therewith the negative pole by the copper bar G'. If, now, the magneto-electric machine is put into motion, the current will first pass on to the copper in compartment $x$, from there through the salt solution across the partition to the copper or other metal in compartment $y$, thence to the negative pole, leaving the solution at $y$ and returning to the machine. The copper in compartment $x$ will rapidly become dissolved, and ought to be continuously replenished, if good results are expected. The solution of subchloride of copper, which is formed at the positive pole, being heavier than the common salt solution, will sink, and, without passing over the partition, will collect in the lower part of compartment $x$, while the same is also true of the solution of sodium formed near the negative pole, which is collected at the bottom of compartment $y$.

I recommend the use of a vessel subdivided and partitioned as shown and above described, although a variety of mechanical contrivances could readily be suggested to accomplish the same end—viz., that of gaining the products of the electrolysis separately, each by itself, to be subsequently mixed in a separate vessel for the production of hydrated suboxide of copper. To obtain this product I interrupt the current and empty the liquid contents of the two compartments from time to time into another vessel, as described. The dissolving-cells may also be so constructed (by omitting the partition) as to admit of a continuous intermixture of the solutions of subchloride of copper and oxide of sodium as rapidly as they are formed, which will be found preferable in producing suboxide of copper. By drawing off and intermixing the solutions in the manner first indicated, I obtain the orange-yellow sediment known as "hydrated suboxide of copper." The sediment having settled, I then draw off the liquid portion and return the same to the dissolving-cells or tanks, to be used in converting further masses of copper. The sediment I purify by filtration through cloth, pouring cold water over it in order to remove the last vestiges of the salt solution, and then I expose the same to the sun or to a low artificial heat until perfectly dry. In this condition the sediment is still of an orange-yellow color. It is particularly adapted to the manufacture of basic acetate of copper, as already stated.

In order to obtain suboxide of copper from the hydrated suboxide, it is only necessary to heat the latter to about 100° centigrade, either by dry heat or by filtering with boiling instead of cold water, and then drying it. The orange-yellow color will thereby turn into a beautiful red. It is hardly necessary to say that this suboxide of copper can be obtained in no other manner with as little expense as by my processes described above, especially the direct process, and I confidently expect that, owing to this cheap and rapid mode of production, it will soon find a more extended use and application in the common arts than its present cost in market permits.

I shall now proceed to point out the details of manufacturing basic acetate and neutral acetate of copper, both of which are closely connected with the process by which hydrated suboxide of copper is so readily and cheaply obtained as aforesaid.

If I want basic acetate of copper, I take the orange-colored hydrated suboxide of copper above described, (taking pains, however, to select only such as has dried in a very low temperature, as aforesaid,) and intermix the same with a certain quantity of neutral acetate of copper, which I keep constantly on hand. The mixture is sprinkled with water, so that it forms a half-dry broken mass, which I leave exposed to the air. Very rapidly—generally within twenty-four hours—this dirty-green-yellow mixture is changed into a fine light-blue product, known as "basic acetate of copper" or "basic verdigris." The proportion in which I mix hydrated suboxide of copper and neutral acetate of copper is 79:198 in weight. If, however, neutral acetate of copper be wanted, it can be readily obtained by pouring acetic acid, previously heated, on the aforesaid basic acetate of copper until the same has become entirely dissolved therein. When the solution cools off again, the neutral verdigris shows itself in crystallized form; but I have found the following method of preparation preferable, viz: I take the red-colored suboxide of copper, such as is obtained either by washing with boiling water and rapid drying or by the direct process, as aforesaid, and first pulverize and then moisten the same with pure acetic acid until the mass is thoroughly damp, though not plastic. This damp powder I expose to the influence of the air. While drying it gradually turns green. Dampening with acetic acid is continued from time to time until the originally red mixture has altogether changed to a beautiful green, and not the least particle of unoxidized suboxide of copper can longer be discovered. Lumps that may form during this process ought to be carefully crushed and pulverized; and the operation can be very much advanced by running the material, when approximately dry, a few times through crushers. If the acetic acid used has been pure and other impurities have been avoided, the powder in this form is ready for market. It is a beautiful green pulverized acetate of copper or neutral verdigris; but if it becomes necessary to purify the same, I dissolve it in boiling water, and when the solution cools off we find the desired product forming in the shape of crystals, in a pure state.

The several ultimate products referred to above may be obtained with equal advantage by substituting a solution of chloride of potassium, as the electrolyte, for the solution of chloride of sodium, the intermediate products alone, but not the ultimate products, being thereby modified.

I am aware that the British patent to Fitz Gerald and Molloy, No. 1,376 of 1872, describes a process of separating metals from their ores by electrolysis, in which a solution of common salt is employed for the electrolyte, and the metal in the ore acted on by the liberated chlorine; but the production of suboxide of copper or hydrated suboxide of copper is not contemplated in that patent, nor would either of these compounds result from the mode of procedure therein defined. Still less does the British patent referred to contain any suggestion that would lead to the production of the acetates of copper.

What I claim as new, and desire to secure by Letters Patent, is—

1. The process of making basic acetate of copper, which consists, first, in passing an electric current through a solution of chloride of sodium or chloride of potassium, using copper as an anode and any suitable substance as a cathode, keeping the products forming at the opposite poles separate from each other, and then mixing them together, whereby hydrated suboxide of copper is precipitated; and, secondly, in mixing the precipitated hydrated suboxide of copper, properly washed and dried, with neutral acetate of copper, moistening the mixture with water, and exposing it to the air, substantially as described.

2. The process of producing basic acetate of copper from hydrated suboxide of copper, which consists in mixing the hydrated suboxide of copper with neutral acetate of copper, in the proportion of seventy-nine parts, in weight, of the former to one hundred and ninety-eight parts, in weight, of the latter, moistening the mixture with water, and exposing it to the air, as set forth.

JOHANN KARL KESSLER.

In presence of—
F. W. COTSHAUSEN,
GEORGE L. JONES.